United States Patent
Shoji et al.

(10) Patent No.: US 9,951,854 B2
(45) Date of Patent: Apr. 24, 2018

(54) DIFFERENTIAL GEAR SET ASSEMBLING METHOD AND DIFFERENTIAL GEAR SET ASSEMBLING DEVICE

(71) Applicant: TOYOTA JIDOSHA KABUSHIKI KAISHA, Toyota-shi (JP)

(72) Inventors: Yasuhiro Shoji, Toyota (JP); Takahisa Masuyama, Okazaki (JP); Masaya Komada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 77 days.

(21) Appl. No.: 15/153,993

(22) Filed: May 13, 2016

(65) Prior Publication Data
US 2016/0341296 A1    Nov. 24, 2016

(30) Foreign Application Priority Data

May 18, 2015    (JP) .................................. 2015-101434

(51) Int. Cl.
| | |
|---|---|
| *B23P 19/04* | (2006.01) |
| *F16H 48/38* | (2012.01) |
| *F16H 48/06* | (2006.01) |
| *F16H 48/08* | (2006.01) |
| *F16H 57/00* | (2012.01) |

(Continued)

(52) U.S. Cl.
CPC .............. *F16H 48/38* (2013.01); *B23P 19/04* (2013.01); *F16H 48/06* (2013.01); *B23P 19/08* (2013.01); *B23P 19/10* (2013.01); *B23P 19/12* (2013.01); *B23P 21/00* (2013.01); *F16H 48/08* (2013.01); *F16H 2048/382* (2013.01); *F16H 2057/0062* (2013.01)

(58) Field of Classification Search
CPC .... B23P 21/00; B23P 21/12; F16H 2048/382; F16H 48/08; F16H 48/00; F16H 48/38
See application file for complete search history.

(56) References Cited

U.S. PATENT DOCUMENTS

| | | | | |
|---|---|---|---|---|
| 3,650,013 A | * | 3/1972 | Boers ...................... | B23P 19/04 |
| | | | | 29/256 |
| 5,400,506 A | * | 3/1995 | Ichiki ..................... | B23P 19/04 |
| | | | | 29/791 |

(Continued)

FOREIGN PATENT DOCUMENTS

| | | |
|---|---|---|
| JP | 5-192830 | 8/1993 |
| JP | 6-254732 A | 9/1994 |

(Continued)

*Primary Examiner* — Jason L Vaughan
(74) *Attorney, Agent, or Firm* — Oblon, McClelland, Maier & Neustadt, L.L.P.

(57) ABSTRACT

A differential gear set assembling method includes: a pivoting step of closing openings by guide portion and pivoting a pair of pinions between a pair of side gears; and an insertion step of inserting a pinion shaft into a pair of case shaft holes and a pair of pinion shaft holes from outside the differential case. The pivoting step is performed in a state where projecting portions are buried in the guide portions. The insertion step is performed in a state where the projecting portions are projected from the guide portions toward the pair of side gears, and the pair of side gears are pressed by the projecting portions so as to apply loads against biasing forces of coned disc springs to the pair of side gears.

3 Claims, 9 Drawing Sheets

(51) Int. Cl.
  *B23P 19/08* (2006.01)
  *B23P 19/10* (2006.01)
  *B23P 21/00* (2006.01)
  *B23P 19/12* (2006.01)

(56) References Cited

U.S. PATENT DOCUMENTS

| | | | |
|---|---|---|---|
| 6,249,969 | B1 | 6/2001 | Komatsu et al. |
| 7,976,421 | B2 * | 7/2011 | Nakajima ............... F16H 48/08 475/160 |
| 9,657,830 | B2 * | 5/2017 | Masuyama ............. F16H 48/38 |
| 2007/0111841 | A1 * | 5/2007 | Smith ..................... F16H 48/08 475/230 |
| 2013/0225356 | A1 | 8/2013 | Tanaka et al. |

FOREIGN PATENT DOCUMENTS

| | | |
|---|---|---|
| JP | 11-33846 A | 2/1999 |
| JP | 2000-202726 A | 7/2000 |
| JP | 2013-174323 | 9/2013 |
| JP | 2014-61572 | 4/2014 |

* cited by examiner (S140)

DIFFERENTIAL GEAR SET ASSEMBLING METHOD AND DIFFERENTIAL GEAR SET ASSEMBLING DEVICE

INCORPORATION BY REFERENCE

The disclosure of Japanese Patent Application No. 2015-101434 filed on May 18, 2015 including the specification, drawings and abstract is incorporated herein by

BACKGROUND OF THE INVENTION

1. Field of the Invention

The present invention relates to a differential gear set assembling method and a differential gear set assembling device.

2. Description of Related Art

Conventionally, a differential gear set assembling device is well known as a device for assembling a differential gear set. The differential gear set includes a differential case, a pair of pinions that rotate with the differential case, and a pair of side gears that mesh with the pinions.

When the differential gear set is assembled by use of the differential gear set assembling device, the pair of side gears are placed on a top side and on a bottom side inside the differential case via coned disc springs, and a pinion temporary assembled product in which the pair of pinions are disposed at both ends of a dummy shaft is inserted into the differential case from an opening formed in the differential case, so that the pinion temporary assembled product meshes with the side gears. Subsequently, when the pinion temporary assembled product is rotated by substantially 90°, the dummy shaft is inserted into a pair of shaft holes formed in the differential case. After that, a pinion shaft is inserted into the pair of shaft holes from outside the differential case, so as to replacing the dummy shaft with the pinion shaft. Hereby, the differential gear set is finished (e.g., see Japanese Patent Application Publication No. 05-192830 (JP 05-192830 A)).

However, since the pair of side gears are biased by the coned disc springs in directions where the pair of side gears approach each other in the differential case, when the pinion shaft is inserted, the pinions receive loads from the side gears. Accordingly, at the time when the pinion shaft is inserted, the pinions are being restricted, so that a positional displacement of pinion shaft holes in the pinions, inclination (which means an inclination of an axial center of the pinion shaft hole in the pinion with respect to an insertion direction of the pinion shaft), and the like occur, which might cause poor insertion of the pinion shaft.

Further, at the time when the pinion shaft is inserted, if the pinion shaft is inserted with an excessive force, an inner diameter portion of the pinion is scratched, which causes poor quality of the pinion.

Meanwhile, it is conceivable, for example, that a device for reducing the loads from the side gears to the pinions is provided in the differential gear set assembling device separately at the time when the pinion shaft is inserted. However, in the differential gear set assembling device, a space in which to provide the device separately is narrow, so it is difficult to really provide the device. Accordingly, it is desirable to realize a mechanism for reducing the loads from the side gears to the pinions with a simple configuration in which the mechanism is provided in an existing device or mechanism in the differential gear set assembling device.

SUMMARY OF THE INVENTION

In view of the above problem, the present invention provides a differential gear set assembling method and a differential gear set assembling device that can reduce, with a simple configuration, poor insertion of a pinion shaft by reducing loads applied to pinions from side gears at the time when a pinion shaft is inserted.

In view of this, one aspect of the present invention provides a differential gear set assembling method including a preparing step, a placing step, a pivoting step, and an insertion step. Here, a differential gear set includes a differential case, a pair of side gears, biasing portions, a pair of pinions, and a pinion shaft. The differential case has openings and a pair of case shaft holes. The pair of side gears are placed such that respective tooth flanks are opposed to each other inside the differential case. The biasing potions are configured to bias the pair of side gears in directions where the pair of side gears approach each other. The pair of pinions are placed between the pair of side gears, so as to mesh with the pair of side gears, the pair of pinions are placed such that respective tooth flanks are opposed to each other, and the pair of pinions have respective pinion shaft holes. The pinion shaft is inserted into the pair of pinion shaft holes and the pair of case shaft holes. The preparing step prepares guide portions configured to guide the pinions by closing the openings at the time when the pair of pinions are pivoted between the pair of side gears, and projecting portions configured to project from the guide portions toward the pair of side gears or to be buried in the guide portions. The placing step places the pair of side gears, the biasing portions, and the pair of pinions inside the differential case by inserting the pair of side gears, the biasing portions, and the pair of pinions into the differential case from the opening. The pivoting step (i) brings the projecting portions into a state where the projecting portions are buried in the guide portions, (ii) closes the openings by the guide portions, and (iii) pivots the pair of pinions between the pair of side gears such that the pair of case shaft holes and the pair of pinion shaft holes are placed coaxially. The insertion step (i) projects the projecting portions from the guide portions toward the pair of side gears, (ii) presses the pair of side gears by the projecting portions, (iii) brings the pair of side gears into a state where loads against biasing forces of the biasing portions are applied to the pair of side gears, and (iv) inserts the pinion shaft into the pair of case shaft holes and the pair of pinion shaft holes from outside the differential case.

Further, in the differential gear set assembling method, respective differential-case-side end surfaces of the guide portions may have a substantially spherical shape.

Further, in the differential gear set assembling method, in the insertion step, the projecting portions may be brought into contact with bottom lands of the pair of side gears so as to press the pair of side gears.

Another aspect of the present invention provides a differential gear set assembling device for assembling a differential gear set. Here, the differential gear set includes a differential case, a pair of side gears, biasing portions, a pair of pinions, and a pinion shaft. The differential case has openings and a pair of case shaft holes. The pair of side gears are placed such that respective tooth flanks are opposed to each other inside the differential case. The biasing potions are configured to bias the pair of side gears in directions where the pair of side gears approach each other. The pair of pinions are placed between the pair of side gears so as to mesh with the pair of side gears, the pair of pinions are placed such that respective tooth flanks are opposed to each other, and the pair of pinions have respective pinion shaft holes. The pinion shaft is inserted into the pair of pinion shaft holes and the pair of case shaft holes. The differential gear set assembling device includes guide portions and projecting portions. The guide portions are configured to guide the pinions by closing the openings at the time when the pair of pinions are pivoted between the pair of side gears. The projecting portions are configured (i) to project from the guide portions toward the pair of side gears or to be buried in the guide portions, (ii) to be buried in the guide portions at the time when the guide portions close the openings to pivot the pair of pinions between the pair of side gears, and (iii) to project from the guide portions toward the pair of side gears to press the pair of side gears so as to apply, to the pair of side gears, loads against biasing forces of the biasing portions, at the time when the pinion shaft is inserted into the pair of case shaft holes and the pair of pinion shaft holes from outside the differential case.

Further, in the differential gear set assembling device, respective differential-case-side end surfaces of the guide portions may have a substantially spherical shape.

Further, in the differential gear set assembling device, the projecting portions may be configured to abut with bottom lands of the pair of side gears at the time of pressing the pair of side gears.

According to the differential gear set assembling method and the differential gear set assembling device of the present invention, it is possible to reduce, with a simple configuration, poor insertion of a pinion shaft by reducing loads applied to the pinions from the side gears at the time when the pinion shaft is inserted therein.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
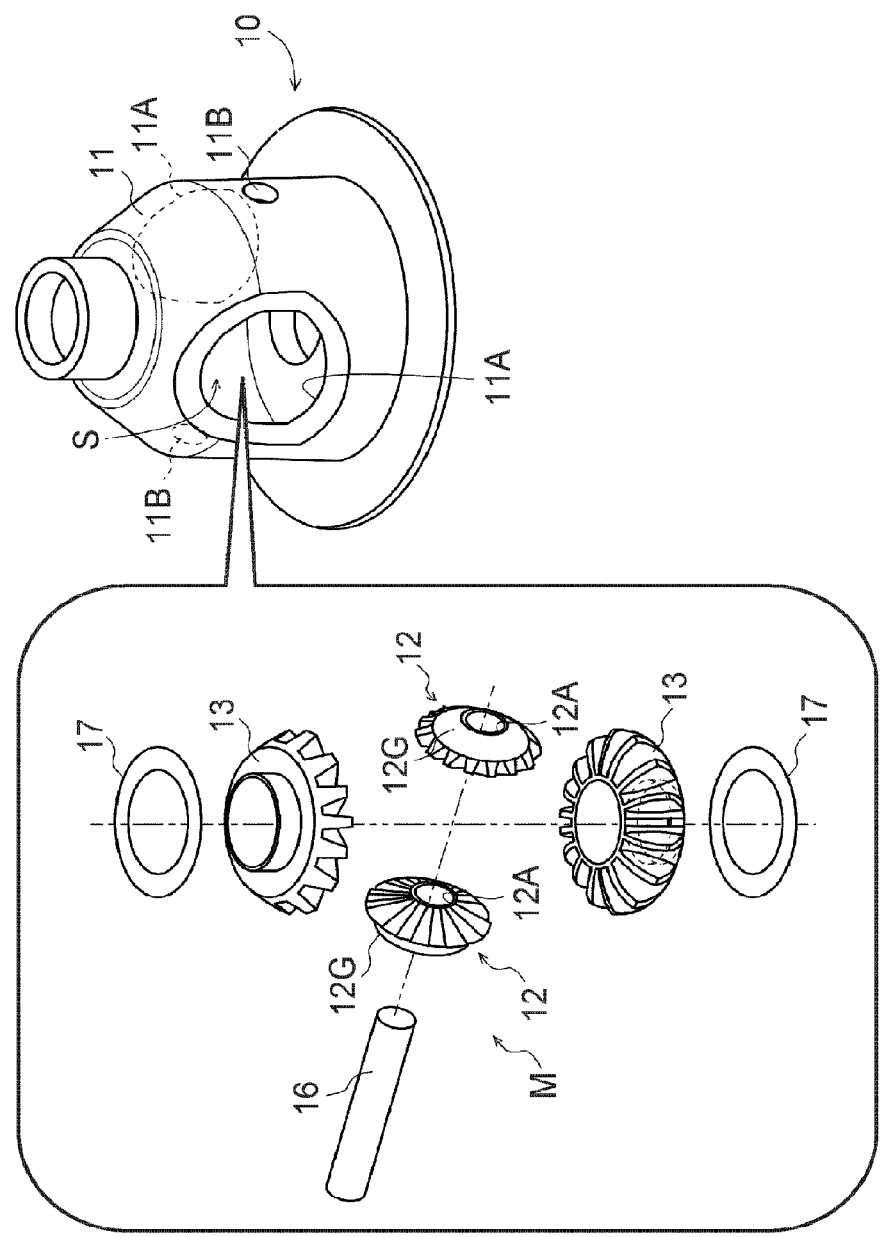
FIG. 1 is a perspective view illustrating a configuration of a differential gear set.

With the use of FIG. 1, the following describes a configuration of a differential gear set 10. Note that FIG. 1 schematically illustrates the configuration of the differential gear set 10 in a perspective view. Further, for easy understanding of the description, each component is taken out from a differential case 11 to be illustrated in FIG. 1 in an exploded manner.

The differential gear set 10 includes the differential case 11, a pair of pinions 12, 12, and a pair of side gears 13, 13, and coned disc springs 17, 17 as biasing portions.

The differential case 11 is formed substantially in a bell shape, and a space S is formed thereinside. The pair of pinions 12, 12, and the pair of side gears 13, 13, and the coned disc springs 17, 17 are placed inside the space S. A pair of openings 11A, 11A and a pair of case shaft holes 11B, 11B are formed on a peripheral side surface of the differential case 11.

The pair of openings 11A, 11A are formed at positions opposed to each other. The pair of case shaft holes 11B, 11B are formed at positions opposed to each other such that phases thereof are shifted from the pair of openings 11A, 11A by about 90° in a circumferential direction in a plan view.

The pair of side gears 13 are placed in an upper end and a lower end in the space S of the differential case 11, and each of the coned disc springs 17 is provided between a corresponding one of the side gears 13 and an inner surface of the differential case 11. The pair of side gears 13, 13 are biased by the coned disc springs 17, 17 in directions where the pair of side gears 13, 13 approach each other.

The pair of pinions 12, 12 are placed between the pair of side gears 13, 13. The pair of pinions 12, 12 are placed so as to mesh with the pair of side gears 13, 13. A pinion shaft hole 12A is formed in the pinion 12. The pinion 12 is placed in such a posture that an axial center of the pinion shaft hole 12A is perpendicular to a rotation axial center of the side gear 13. Further, a surface of the pinion 12 on an opposite side to a side thereof where a tooth flank is formed is formed in a spherical shape, so as to constitute a spherical portion 12G.

A pinion shaft 16 is inserted into the pinion shaft holes 12A, 12A of the pair of pinions 12, 12. The pair of pinions 12, 12 are disposed at both ends of the pinion shaft 16 so as to constitute a pinion assembled product M. The both ends of the pinion shaft 16 are placed at both axial ends of the pinion assembled product M and inserted into the pair of case shaft holes 11B, 11B of the differential case 11.

Figure 2:
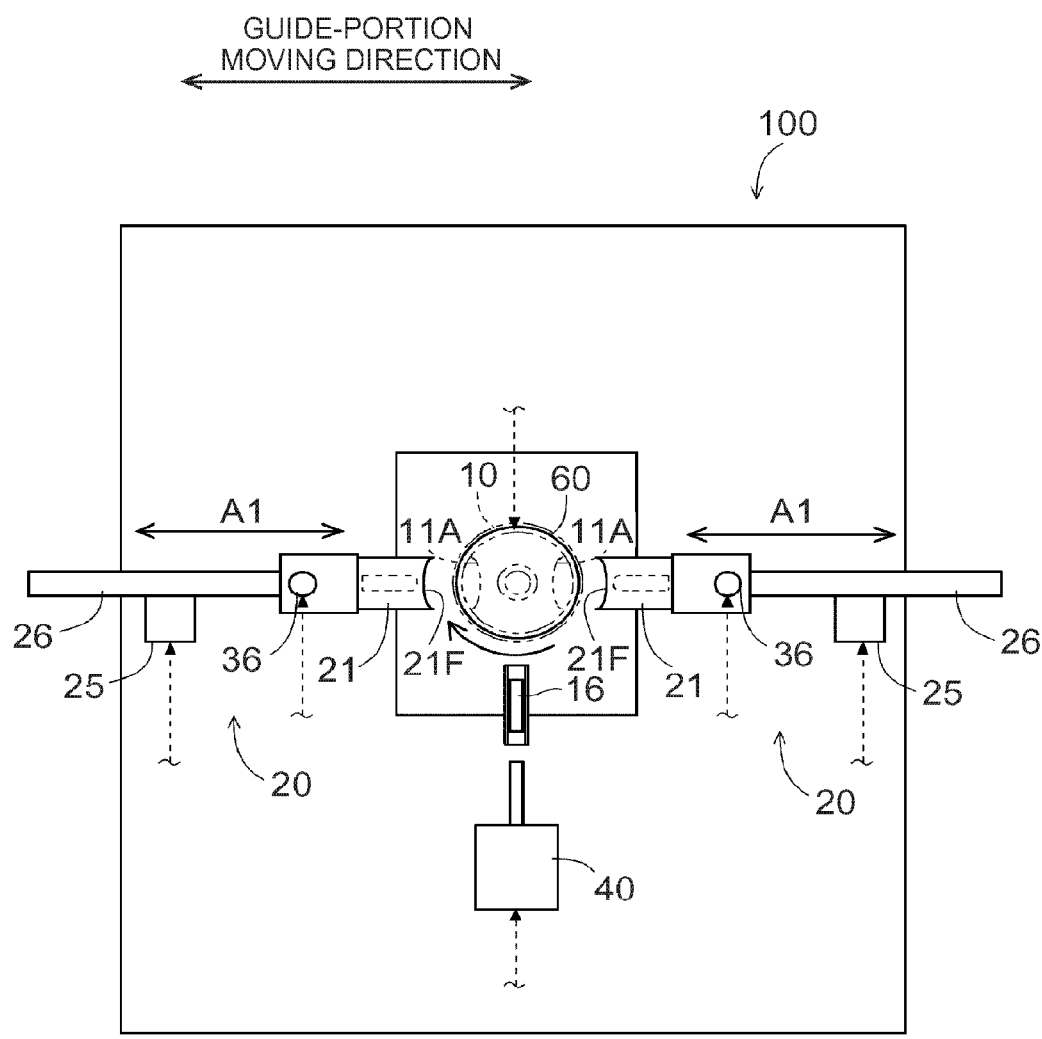
FIG. 2 is a plan view illustrating a configuration of a differential gear set assembling device of an embodiment as an example of the present invention.

With the use of FIG. 2, the following describes a configuration of a differential gear set assembling device 100. Note that FIG. 2 schematically illustrates the configuration of the differential gear set assembling device 100 in a plan view. Further, for easy understanding of the description, the differential gear set 10 in the middle of assembling is indicated by an alternate long and two short dashes line and an electric signal wire is indicated by a broken line in FIG. 2. Further, the following description is made according to a guide-portion moving direction or an up-down direction described in FIG. 2 or FIG. 3.

The differential gear set assembling device 100 is one embodiment of a differential gear set assembling device of the present invention. The differential gear set assembling device 100 is a device for assembling the differential gear set 10. The differential gear set assembling device 100 includes spherical-surface guide devices 20, 20, an insertion device 40, a controller 50, and a rotary device 60.

At the time when the pair of pinions 12, 12 inserted into the differential case 11 are pivoted around the rotation axial center of the pair of side gears 13, 13 between the pair of side gears 13, 13 during the assembly of the differential gear set 10, the spherical-surface guide device 20 closes the opening 11A by a guide surface 21F of a guide portion 21 (described later in details) so as to guide the pair of pinions 12, 12 that move rotationally.

The spherical-surface guide devices 20, 20 are placed at positions opposed to respective openings 11A, 11A, outside the differential case 11.

The present paragraph describes a configuration of one spherical-surface guide device 20. The spherical-surface guide device 20 is supported by a support portion 26. The support portion 26 is configured to be movable in a direction where the support portion 26 approaches/separates with respect to the opening 11A by a driving device 25 including a servomotor (a continuous arrow A1 in FIG. 2). That is, the guide portion 21 of the spherical-surface guide device 20 is configured to be movable in the direction where the guide portion 21 approaches/separates with respect to the opening 11A by the driving device 25. The driving device 25 is connected to the controller 50.

The insertion device 40 is a device for inserting the pinion shaft 16 into the differential case 11 from outside during the assembly of the differential gear set 10. The insertion device 40 is placed at a position where a phase thereof is shifted from one spherical-surface guide device 20 by substantially 90° in a plan view. The insertion device 40 includes a push arm and is connected to the controller 50.

The rotary device 60 is a device for pivoting only the lower-side side gear 13 assembled inside the differential case 11, during the assembly of the differential gear set 10. The rotary device 60 includes a servomotor and is connected to the controller 50.

The controller 50 has a function to control a moving amount of the guide portion 21 of the spherical-surface guide device 20 in a direction toward the opening 11A, an insertion timing of the pinion shaft 16 by the insertion device 40, a pivoting amount of the rotary device 60, and a driving amount of the after-mentioned cylinder 36. The controller 50 is connected to the driving device 25, the insertion device 40, the rotary device 60, and the cylinder 36.

Figure 3:
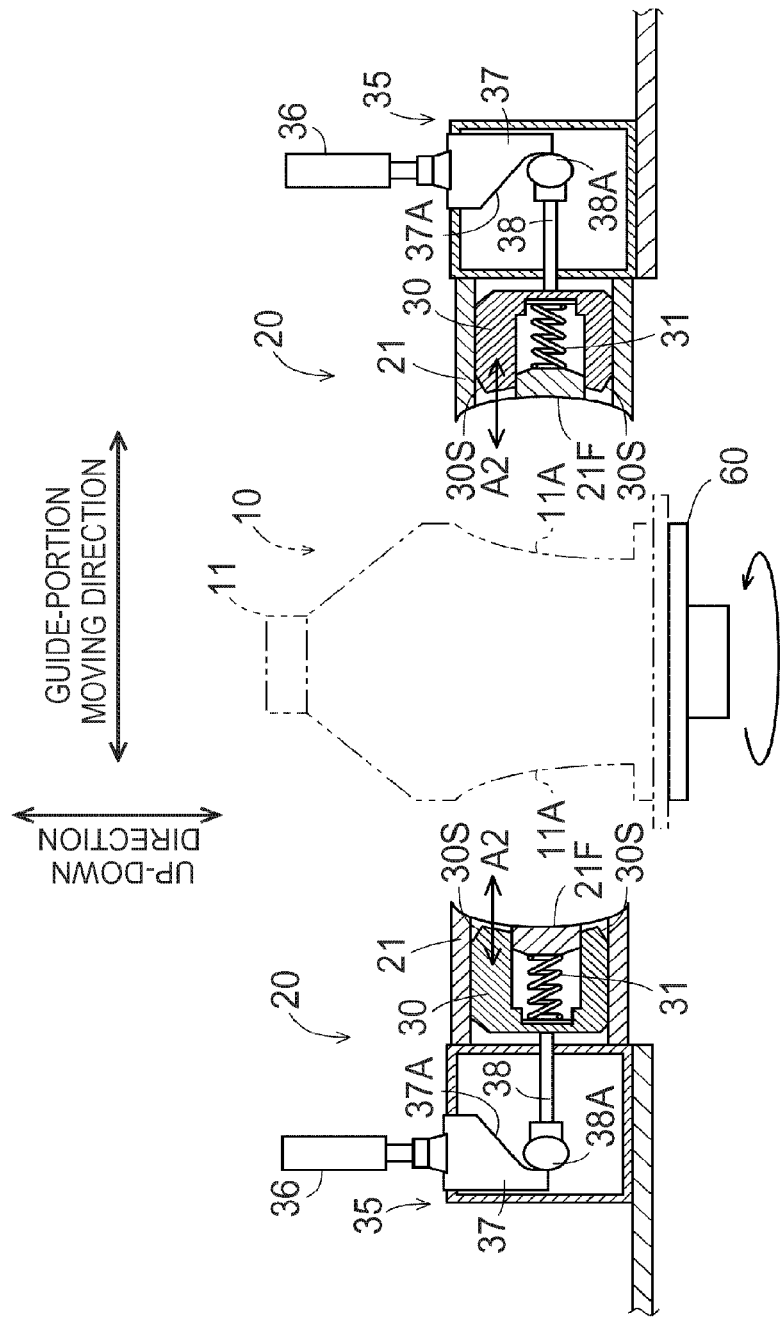
FIG. 3 is a partial sectional side view illustrating a configuration of a spherical-surface guide device provided in the differential gear set assembling device.

With reference to FIG. 3, the following describes the configuration of the spherical-surface guide device 20. Note that FIG. 3 schematically illustrates the configuration of the spherical-surface guide device 20 in a side view including a partial sectional view. Further, for easy understanding of the description, the differential gear set 10 in the middle of assembling is indicated by an alternate long and two short dashes line in FIG. 3.

The following describes the configuration of one spherical-surface guide device 20. As described above, at the time when the pair of pinions 12, 12 inserted into the differential case 11 are pivoted around the rotation axial center of the pair of side gears 13, 13 between the pair of side gears 13, 13 during the assembly of the differential gear set 10, the spherical-surface guide device 20 closes the openings 11A of the differential case 11 so as to guide the pair of pinions 12, 12.

The spherical-surface guide device 20 includes the guide portion 21, a projecting portion 30, a spring 31, and a projecting mechanism 35.

The guide portion 21 is placed in a part of the spherical-surface guide device 20 on a differential-case-11 side. The guide surface 21F is formed on a differential-case-11-side end surface of the guide portion 21. The guide surface 21F is formed in a substantially spherical shape that follows a spherical shape of the spherical portion 12G (see FIG. 6) of the pinion 12. The projecting portion 30 is provided inside the guide portion 21.

The projecting portion 30 is configured so as to be projectable from the guide surface 21F toward a differential-case-11 side or to be buried inside the spherical-surface guide device 20 from the guide surface 21F (a continuous arrow A2 in FIG. 3), by means of the projecting mechanism 35.

The projecting portion 30 is formed in a substantially C-shape in a side view. An abutment portion 30S, which is a top face of a differential-case-11 side end of an upper part of the projecting portion 30, is formed in an inclined manner so as to abut with a bottom land 13B (see FIG. 9) of the side gear 13. Similarly, an abutment portion 30S, which is a lower face of a differential-case-11 side end of a lower part of the projecting portion 30, is formed in an inclined manner so as to abut with a bottom land 13B of the side gear 13.

The projecting portion 30 is biased by the spring 31 in a direction where the projecting portion 30 is buried under the guide surface 21F. The spring 31 is placed between the projecting portion 30 and the guide portion 21.

The projecting mechanism 35 is configured to project the projecting portion 30 from the guide surface 21F or to bury the projecting portion 30 under the guide surface 21F. The projecting mechanism 35 includes a cylinder 36, an up-down-direction driving portion 37, and a guide-portion-moving-direction driving portion 38.

The up-down-direction driving portion 37 is configured to be movable in then up-down direction. The up-down-direction driving portion 37 is configured to be driven by the cylinder 36 in the up-down direction. The up-down-direction driving portion 37 has an inclined surface 37A formed to be directed upward toward a differential-case-11 side in the guide-portion moving direction in a side view.

The guide-portion-moving-direction driving portion 38 is configured to be movable in the guide-portion moving direction. A differential-case-11-side end of the guide-portion-moving-direction driving portion 38 in the guide-portion moving direction is connected to the projecting portion 30. An abutment portion 38A is formed in an end of the guide-portion-moving-direction driving portion 38 on an opposite side to the differential-case-11 side in the guide-portion moving direction. The abutment portion 38A is formed in a substantially spherical shape, and is brought into contact with to the inclined surface 37A by a biasing force of the spring 31.

In the projecting mechanism 35 configured as such, the up-down-direction driving portion 37 is driven by the cylinder 36 so as to move in the up-down direction. When the up-down-direction driving portion 37 moves in the up-down direction, the abutment portion 3 8A that abuts with the inclined surface 37A slides over the inclined surface 37A. Since the abutment portion 38A slides over the inclined surface 37A, the guide-portion-moving-direction driving portion 38 is driven to move in the guide-portion moving direction.

Figure 4:
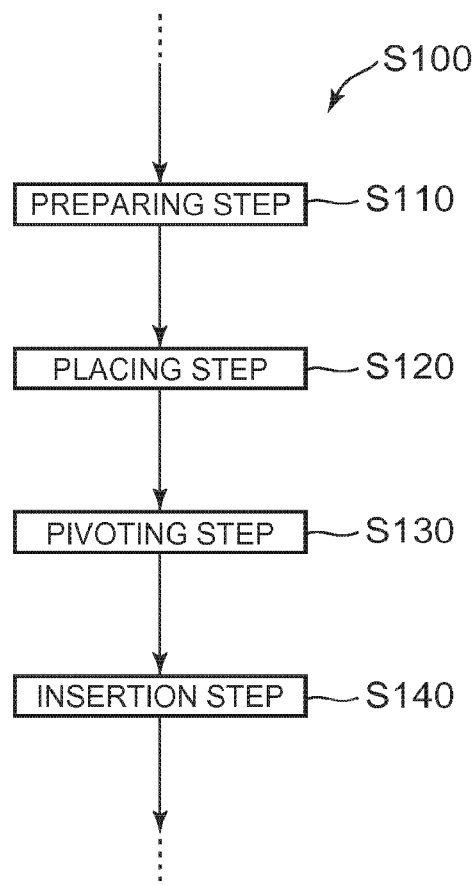
FIG. 4 is a flow diagram illustrating a flow of a differential gear set assembling step.

With the use of FIG. 4, the following describes a flow of a differential gear set assembling step S100. Note that, in FIG. 4, the flow of the differential gear set assembling step S100 is illustrated by a flow chart.

The differential gear set assembling step S100 is an embodiment of a differential gear set assembling method of the present invention. The differential gear set assembling step S100 is a step of assembling the differential gear set 10 by use of the differential gear set assembling device 100.

The differential gear set assembling step S100 includes a preparing step S110, a placing step S120, a pivoting step S130, and an insertion step S140. Note that the preparing step S110 is a step of preparing the differential gear set assembling device 100.

Figure 5A:
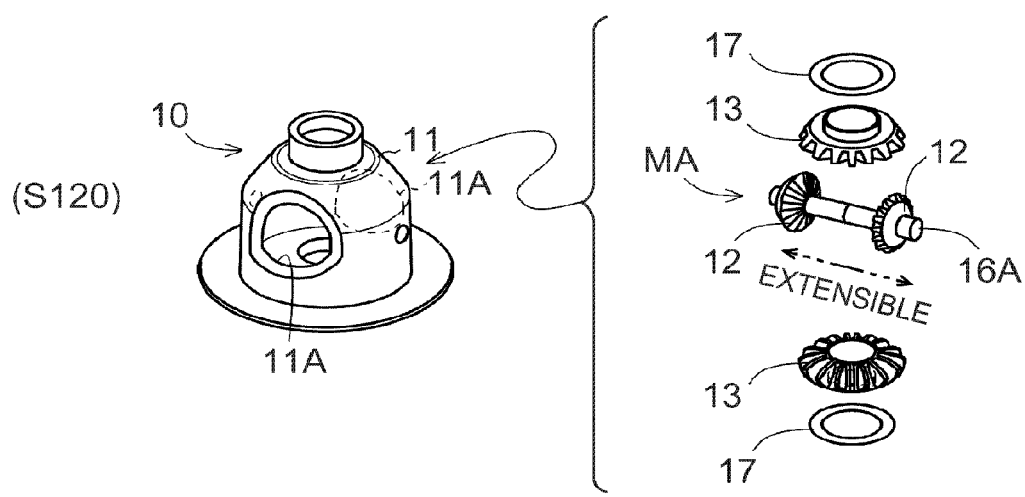
FIGS. 5A and 5B are plan views illustrating flows of a placing step and a pivoting step, which are part of the differential gear set assembling step.
Figure 5B:
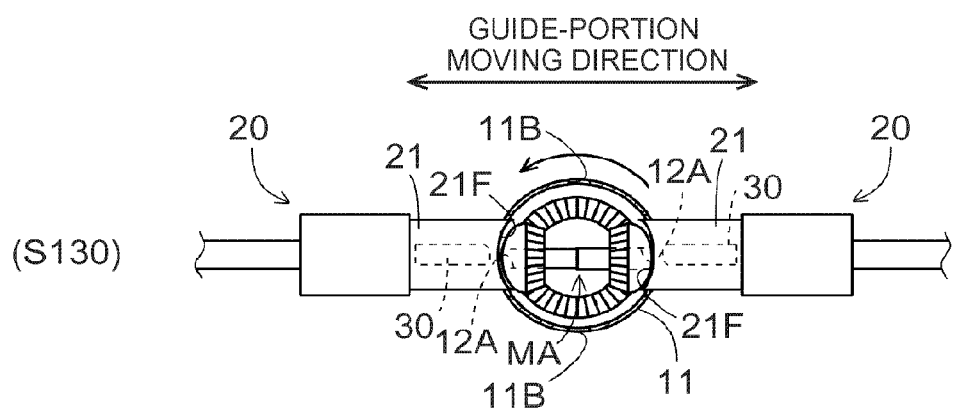

With the use of FIGS. 5A and 5B, the following describes flows of the placing step S120 and the pivoting step S130. Note that FIGS. 5A and 5B schematically illustrate the flows of the placing step S120 and the pivoting step S130 sequentially in the order of steps in a partial sectional plan view typically sequentially.

As illustrated in FIG. 5A, in the placing step S120, an operator or a general-purpose robot inserts the pair of side gears 13, 13, the pair of coned disc springs 17, 17, and a pinion temporary assembled product MA into the differential case 11 from the opening 11A, and places them inside the space S of the differential case 11.

The pinion temporary assembled product MA is configured such that the dummy shaft 16A is inserted into the pinion shaft holes 12A of the pinions 12, 12 and the pinions 12, 12 are placed at both ends of the dummy shaft 16A. The dummy shaft 16A is a shaft member configured to be extensible, and is biased in an extending direction.

Inside the space S, the pair of side gears 13, 13 are placed on an upper side and on a lower side of the space S via the pair of coned disc springs 17, 17, such that their tooth flanks are opposed to each other. The pinion temporary assembled product MA is placed between the pair of side gears 13, 13 in a state where the pair of pinions 12, 12 mesh with the pair of side gears 13, 13. In this state, the pair of side gears 13, 13 are biased by the coned disc springs 17, 17 in directions where the pair of side gears 13, 13 approach each other.

The following describes an operation of one spherical-surface guide device 20. As illustrated in FIG. 5B, in the pivoting step S130, the controller 50 (see FIG. 2) closes the opening 11A of the differential case 11 by the guide surface 21F of the spherical-surface guide device 20 in a state where the projecting portion 30 is buried under the guide surface 21F, and then pivots, by means of the rotary device 60 (see FIG. 2), the pinion temporary assembled product MA only by around 90° in a circumferential direction of the side gear 13 so that the pair of case shaft holes 11B, 11B of the differential case 11 are placed at positions corresponding to the pair of pinion shaft holes 12A.

Figure 6:
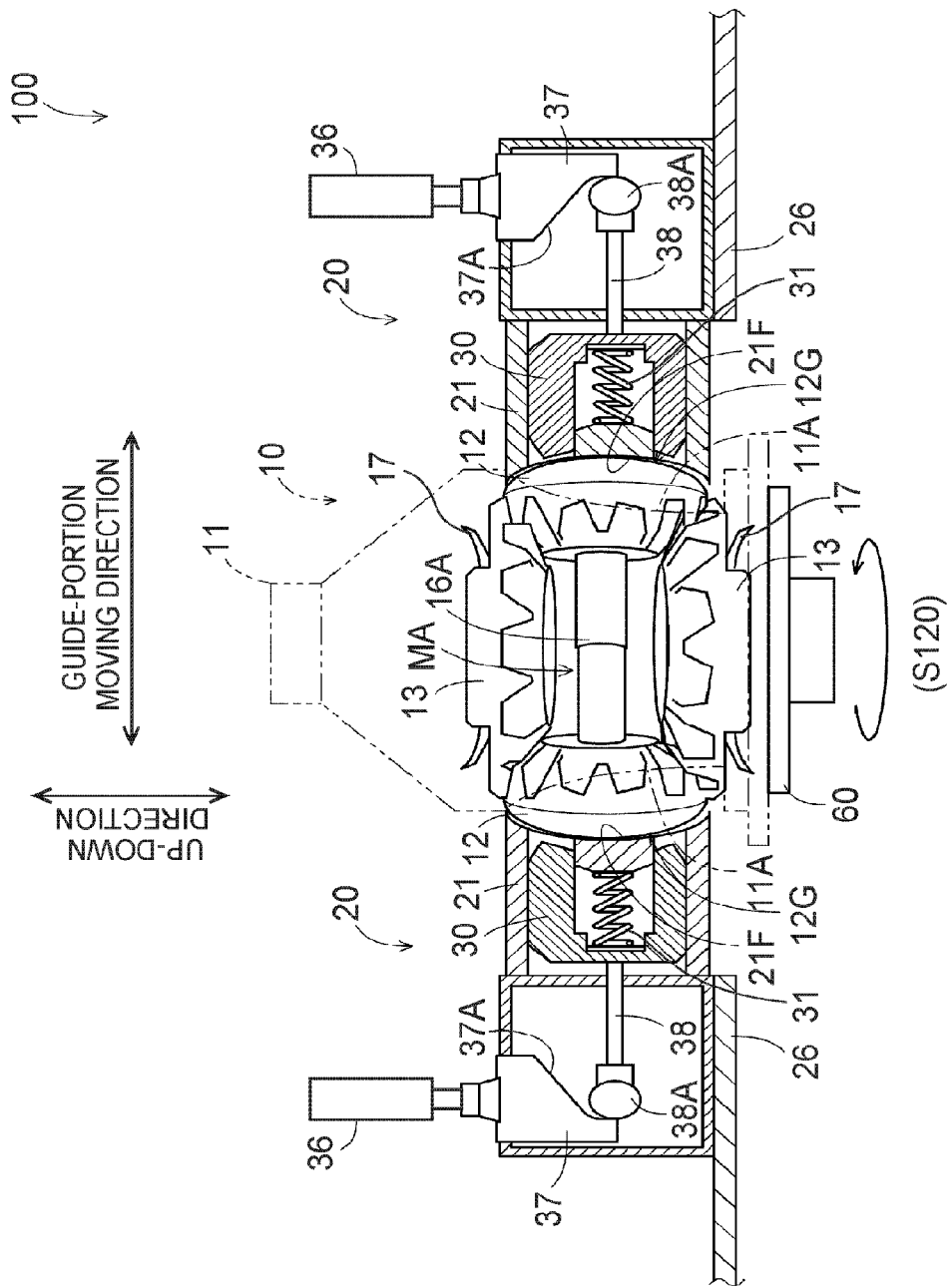
FIG. 6 is a side view illustrating a flow of the pivoting step.

With reference to FIG. 6, the following describes a flow of the pivoting step S130 in detail. Note that FIG. 6 schematically illustrates the flow of the pivoting step S130 in a partial sectional side view.

The controller 50 (see FIG. 2) moves the up-down-direction driving portion 37 in an upper direction by means of the cylinder 36. At this time, the abutment portion 38A slides over the inclined surface 37A of the up-down-direction driving portion toward an opposite side to the differential-case-11 side, so that the guide-portion-moving-direction driving portion 38 moves toward the opposite side to the differential-case-11 side. Hereby, the projecting portion 30 is buried inside the guide portion 21 from the guide surface 21F due to a biasing force of the spring 31.

The controller 50 drives the driving device 25 (see FIG. 2) to cause the guide portion 21 to approach the differential case 11 by means of the support portion 26, so that the opening 11A of the differential case 11 is closed by the guide surface 21F of the guide portion 21 and the guide surface 21F is brought into contact with the spherical portion 12G of the pinion 12.

The controller 50 pivots the lower-side side gear 13 by means of the rotary device 60 so that the spherical portion 12G is guided by the guide surface 21F of the spherical-surface guide device 20, thereby pivoting the pinion temporary assembled product MA only by around 90° in the circumferential direction of the side gear 13.

At this time, in a state where the opening 11A of the differential case 11 is closed by the guide surface 21F, the guide surface 21F and the inner peripheral surface of the differential case 11 are substantially flush with each other. Accordingly, the pinion temporary assembled product MA in which the pinion 12 is placed at a part corresponding to the opening 11A can be pivoted smoothly.

Note that, in a state where the guide surfaces 21F abut with respective spherical portions 12G both ends of the dummy shaft 16A that is extensible and biased in the extending direction abut with the guide surfaces 21F, so that the dummy shaft 16A is reduced and is pushed into the pinions 12.

When the pinion temporary assembled product MA pivots only by about 90°, the pair of case shaft holes 11B, 11B and the pair of pinion shaft holes 12A, 12A are placed coaxially, the dummy shaft 16A extends axially so that the dummy shaft 16A is inserted into the pair of case shaft holes 11B, 11B. Thus, the pinion temporary assembled product MA is supported by the differential case 11.

After the pinion temporary assembled product MA is supported by the differential case 11, the controller 50 drives the driving device 25 to move the guide portion 21 that closes the opening 11A of the differential case 11 toward the opposite side to the differential-case-11 side by means of the support portion 26, so that the guide portion 21 is distanced from the differential case 11 in the middle of assembling.

Figure 7:
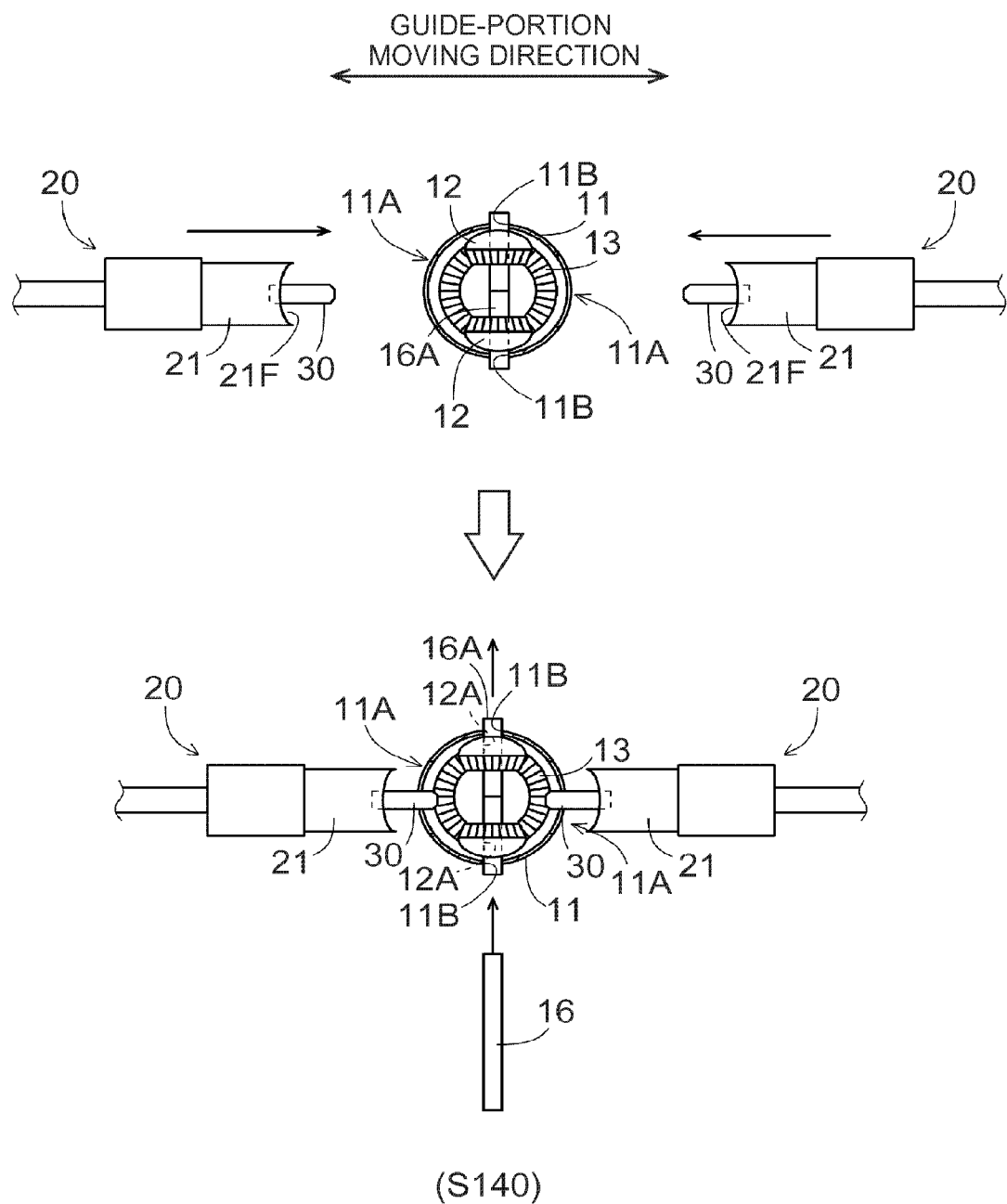
FIG. 7 is a plan view illustrating a flow of an insertion step, which is part of the differential gear set assembling step.

With reference to FIG. 7, the following describes a flow of the insertion step S140 in detail. Note that FIG. 7 schematically illustrates the flow of the insertion step S140 in a partial sectional plan view.

The controller 50 (see FIG. 2) projects the projecting portion 30 from the guide surface 21F of the spherical-surface guide device 20, and causes the spherical-surface guide device 20 in which the projecting portion 30 is projected from the guide surface 21F to approach the differential case 11.

The controller 50 causes the spherical-surface guide device 20 to further approach the differential case 11, so that the projecting portion 30 comes inside the space S through the opening 11A of the differential case 11 so as to abut with the pair of side gears 13, 13.

Then, the controller 50 inserts the pinion shaft 16 into the pair of case shaft holes 11B, 11B and the pair of pinion shaft holes 12A, 12A by means of the insertion device 40 (see FIG. 2), so as to replace, with the pinion shaft 16, the dummy shaft 16A inserted into the pair of case shaft holes 11B, 11B and the pair of pinion shaft holes 12A, 12A.

Figure 8:
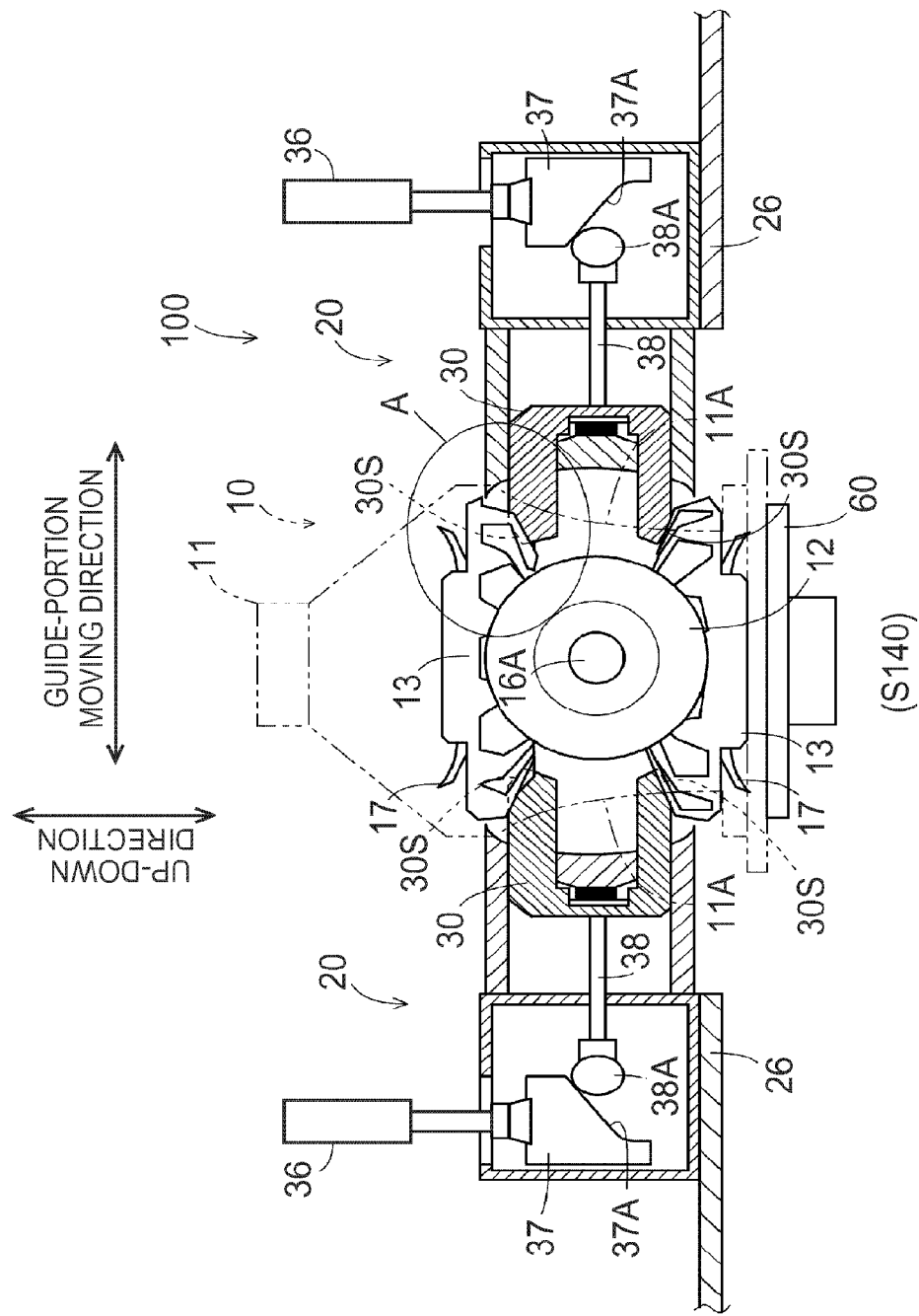
FIG. 8 is a side view illustrating a flow of the insertion step.
Figure 9:
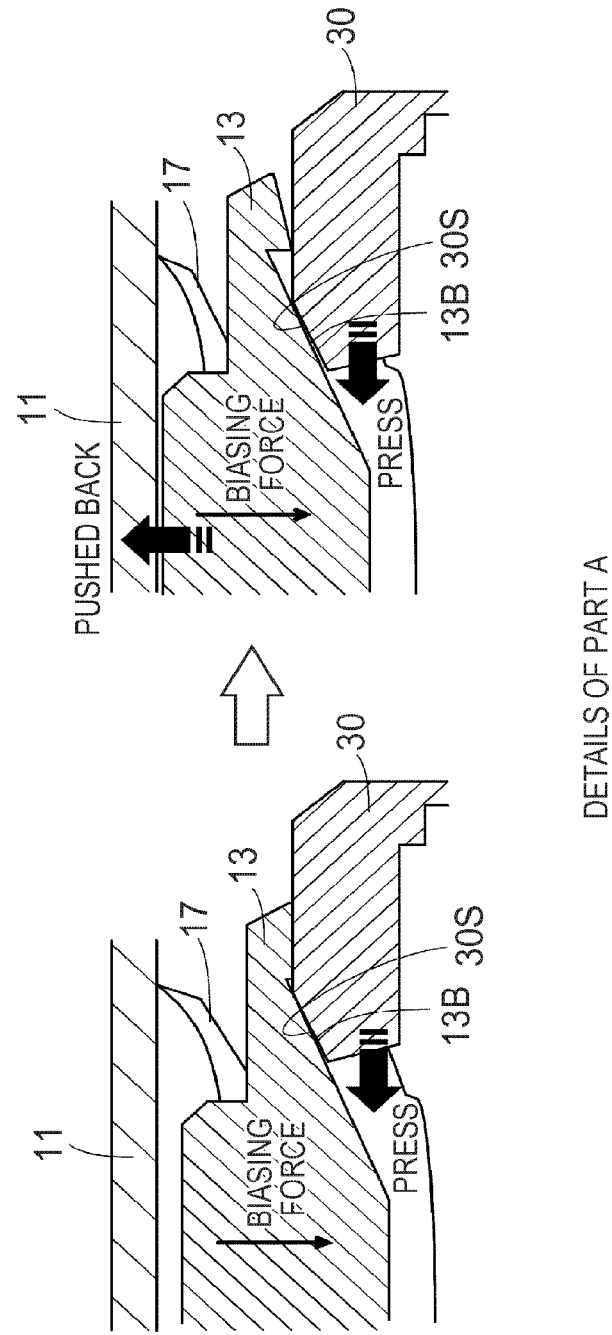
FIG. 9 is a side view illustrating details of a part A illustrated in FIG. 8.

With reference to FIGS. 8 and 9, the following describes the flow of the insertion step S140 in detail. Note that FIG. 8 schematically illustrates the flow of the insertion step S140 in a partial sectional side view. Further, FIG. 9 schematically illustrates details of a part A in FIG. 8 in a partial sectional side view.

In the insertion step S140, the controller 50 (see FIG. 2) drives the up-down-direction driving portion 37 by means of the cylinder 36 so as to move in a lower direction. At this time, the abutment portion 38A slides over the inclined surface 37A of the up-down-direction driving portion 37 toward the differential-case-11 side, so that the guide-portion-moving-direction driving portion 38 moves toward the differential-case-11 side. Hereby, the projecting portion 30 projects from the guide surface 21F against the biasing force of the spring 31.

The controller 50 drives the driving device 25 to cause the guide portion 21 in which the projecting portion 30 projects from the guide surface 21F to approach the differential case 11 by means of the support portion 26. When the guide portion 21 approaches the differential case 11, the abutment portions 30S, 30S of the projecting portion 30 come inside the space S through the opening 11A, so as to abut with the bottom lands 13B, 13B of the pair of side gears 13, 13.

As illustrated in FIG. 9, the controller 50 further moves the projecting portion 30 toward the pair of side gears 13, 13 by means of the support portion 26, from a state where the abutment portions 30S, 30S of the projecting portion 30 abut with the bottom lands 13B, 13B of the pair of side gears 13, 13. Hereby, the projecting portion 30 presses the pair of side gears 13, 13 so that the pair of side gears 13, 13 are supported by the abutment portions 30S, 30S of the projecting portion 30.

From paragraphs 0068 to 0071, only a configuration and an operation of one side gear 13 are described. Here, the bottom land 13B of the side gear 13 is inclined in a biasing direction of the coned disc spring 17 toward a central side of the side gear 13 in a side view. That is, the bottom lands 13B of the side gears 13 are formed to have inclined surfaces that are inclined in directions where the bottom lands 13B of the side gears 13 approach each other toward an inner side in the guide-portion moving direction.

Accordingly, when the abutment portion 30S presses the bottom land 13B of the side gear 13 toward the central side of the side gear 13 in the guide-portion moving direction, the abutment portion 30S and the bottom land 13B slide over each other, so that the side gear 13 is biased in a reverse direction to the biasing force of the coned disc spring 17. As a result, the side gear 13 is pushed back in the reverse direction to the biasing force of the coned disc spring 17. Accordingly, a load applied to the pinion 12 from the side gear 13 is reduced.

Further, even in a case where the abutment portion 30S does not push back the side gear 13, when the abutment portion 30S presses the bottom land 13B of the side gear 13 toward the central side of the side gear 13 in the guide-portion moving direction, a load in the reverse direction to the biasing direction of the coned disc spring 17, that is, a load against the biasing force of the coned disc spring 17 is applied to the side gear 13.

In other words, a load applied to the side gear 13 due to the biasing force of the coned disc spring 17 is offset by a load applied to the side gear 13 due to the abutment portion 30S pressing the bottom land 13B of the side gear 13, so that loads in directions where the side gears 13 approach each other are reduced. Accordingly, a load applied to the pinion 12 from the side gear 13 is reduced.

The controller 50 inserts the pinion shaft 16 into the pair of case shaft holes 11B, 11B and the pair of pinion shaft holes 12A, 12A by means of the insertion device 40 (see FIG. 2) in a state where the loads applied to the pair of pinions 12, 12 from the pair of side gears 13, 13 are reduced. In this case, after the pinion shaft 16 is inserted into one case shaft hole 11B, the pinion shaft 16 is inserted into one pinion shaft hole 12A.

Subsequently, the pinion shaft 16 is further inserted into the other pinion shaft hole 12A and finally inserted into the other case shaft hole 11B.

Here, the dummy shaft 16A inserted into the pair of case shaft holes 11B, 11B and the pair of pinion shaft holes 12A, 12A comes out of the case shaft holes 11B, 11B and the pinion shafts holes 12A, 12A along with the insertion of the pinion shaft 16, and thus, the dummy shaft 16A is replaced with the pinion shaft 16.

At this time, since the loads applied to the pair of pinions 12, 12 from the pair of side gears 13, 13 are reduced, the pair of pinions 12, 12 into which the pinion shaft 16 is to be inserted are released from a restricted state, and a positional displacement of the pinion shaft holes 12A, 12A of the pinions 12, 12, inclination thereof (inclination of the axial centers of the pinion shaft holes 12A, 12A of the pair of pinions 12, 12 with respect to the insertion direction of the pinion shaft 16), and the like do not occur. Consequently, the pinion shaft 16 is inserted therein smoothly.

Effects of the differential gear set assembling step S100 and the differential gear set assembling device 100 will be described below. According to the differential gear set assembling step S100 and the differential gear set assembling device 100, when the pinion shaft 16 is inserted into the differential case 11, the loads applied to the pair of pinions 12, 12 from the pair of side gears 13, 13 can be reduced with a simple configuration, thereby making it possible to reduce poor insertion of the pinion shaft 16.

That is, according to the differential gear set assembling step S100 and the differential gear set assembling device 100, the projecting portion 30 is provided in the existing spherical-surface guide device 20, and in the insertion step S140, the projecting portion 30 is brought into contact with the pair of side gears 13, so that the loads applied to the pair of pinions 12, 12 from the pair of side gears 13, 13 can be reduced.

Further, according to the differential gear set assembling device 100, since the abutment portions 30S, 30S of the projecting portion 30 engage with the bottom lands 13B, 13B of the pair of side gears 13, 13, the side gears 13 can be surely supported, and a deficiency in which teeth of the side gears 13 are damaged can be prevented.

Note that the present embodiment deals with a configuration in which the abutment portions 30S, 30S of the projecting portion 30 abut with the bottom lands 13B, 13B of the side gears 13, 13, but the present invention is not limited to this. For example, even with a configuration in which the abutment portion 30S, 30S of the projecting portion 30 abut with top lands of the pair of side gears 13, 13, it is possible to yield an effect that the pair of side gears 13, 13 are pushed back in reverse directions to biasing directions of the pair of coned disc springs 17, and to yield an effect that the loads applied to the pair of pinions 12, 12 from the pair of side gears 13, 13 are reduced.

What is claimed is:

1. A differential gear set assembling method for assembling a differential gear set, the differential gear set including a differential case, a pair of side gears, biasing portions, a pair of pinions, and a pinion shaft, the differential case having openings and a pair of case shaft holes, the pair of side gears being placed such that respective tooth flanks are opposed to each other inside the differential case, the biasing portions being configured to bias the pair of side gears in directions where the pair of side gears approach each other, the pair of pinions being placed between the pair of side gears so as to mesh with the pair of side gears, the pair of pinions being placed such that respective tooth flanks are opposed to each other, the pair of pinions having respective pinion shaft holes, the pinion shaft being inserted into the pair of pinion shaft holes and the pair of case shaft holes, the differential gear set assembling method comprising:

a preparing step of preparing guide portions that guide the pinions by closing the openings at a time when the pair of pinions are pivoted between the pair of side gears, and projecting portions configured to project from the guide portions toward the pair of side gears or to be buried in the guide portions;

a placing step of placing the pair of side gears, the biasing portions, and the pair of pinions inside the differential case, by inserting the pair of side gears, the biasing portions, and the pair of pinions into the differential case from the opening;

a pivoting step of (i) bringing the projecting portions into a state where the projecting portions are buried in the guide portions, (ii) closing the openings by the guide portions, and (iii) pivoting the pair of pinions between the pair of side gears such that the pair of case shaft holes and the pair of pinion shaft holes are placed coaxially; and an insertion step of (i) projecting the projecting portions from the guide portions toward the pair of side gears, (ii) pressing the pair of side gears by the projecting portions, (iii) bringing the pair of side gears into a state where loads against biasing forces of the biasing portions are applied to the pair of side gears, and (iv) inserting the pinion shaft into the pair of case shaft holes and the pair of pinion shaft holes from outside the differential case.

2. The differential gear set assembling method according to claim 1, wherein respective differential-case-side end surfaces of the guide portions have a substantially spherical shape.

3. The differential gear set assembling method according to claim 1, wherein in the insertion step, the projecting portions are brought into contact with bottom lands of the pair of side gears so as to press the pair of side gears.

* * * * *